(12) United States Patent
Yano et al.

(10) Patent No.: US 6,656,610 B2
(45) Date of Patent: Dec. 2, 2003

(54) PHOSPHOR THIN FILM, PREPARATION METHOD, AND EL PANEL

(75) Inventors: Yoshihiko Yano, Tokyo (JP); Tomoyuki Oike, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/866,693

(22) Filed: May 30, 2001

(65) Prior Publication Data

US 2002/0155317 A1 Oct. 24, 2002

(30) Foreign Application Priority Data

Apr. 19, 2001  (JP) .......................................... 2001-121592

(51) Int. Cl.[7] .......................... H05B 33/12; C09K 11/84; B05D 5/06; B05D 5/12
(52) U.S. Cl. ....................... 428/690; 428/917; 313/502; 313/503; 252/301.4 R; 252/301.4 S; 427/64; 427/66; 257/102; 257/103
(58) Field of Search ................... 252/301.4 R, 301.4 S; 264/21; 313/502, 503; 365/111; 428/403, 690, 917; 257/102, 103; 427/64, 66

(56) References Cited

U.S. PATENT DOCUMENTS

| | | | | |
|---|---|---|---|---|
| 5,717,289 A | * | 2/1998 | Tanaka | 313/503 |
| 6,072,198 A | * | 6/2000 | Sun et al. | 257/103 |
| 6,153,123 A | * | 11/2000 | Hampden-Smith et al. | 252/301.45 |
| 6,180,029 B1 | * | 1/2001 | Hampden-Smith et al. | 252/301.4 R |

FOREIGN PATENT DOCUMENTS

| JP | 7-122364 | 5/1995 |
|---|---|---|
| JP | 8-134440 | 5/1996 |

OTHER PUBLICATIONS

T.E. Peters, J. Electrochem Soc., vol. 119, no 12, pp. 1720–1723, "Luminescent Properties of Thiogallate Phosphors", Dec. 1972.*

M. Kawanishi, et al., Technical Report of IEICE, EID98–113, pp. 19–24, "$CaAl_2S_4$:Ce Thin Film EL Devices Prepared by the Two Targets Pulse Electron–Beam Evaporation", Jan. 1999 (with partial English translation).

N. Miura, et al., Jpn. J. Appl. Phys., vol. 38, Part 2, No. 11B, pp. L1291–L1292, "High–Luminance Blue–Emitting $BaAl_2S_4$:Eu Thin–Film Electroluminescent Devices", Nov. 15, 1999.

S. Oshio, et al., Display and Imaging, vol. 3, No. 2, pp. 181–187, "Novel Electroluminescent Thin Films: Thiogallate–Type Phosphors", 1994 (with Concise Explanation and partial English translation).

(List continued on next page.)

Primary Examiner—Marie Yamnitzky
Assistant Examiner—Camie S Thompson
(74) Attorney, Agent, or Firm—Oblon, Spivak, McClelland, Maier & Neustadt, P.C.

(57) ABSTRACT

The invention aims to provide a phosphor thin film eliminating a need for filters, having a satisfactory color purity, suited for RGB in full-color EL displays, enabling to simplify the manufacture process of full-color EL panels, and offering the advantages of minimized variation of luminance, increased yields, and reduced manufacture cost, a method for preparing the same and an EL panel. Such objects are achieved by a phosphor thin film formed of a matrix material comprising an oxysulfide consisting of at least one compound selected from rare earth thioaluminates, rare earth thiogallates and rare earth thioindates, in which oxygen is incorporated, the matrix material further containing an element serving as a luminescent center, a method for preparing the same, and an EL panel using the same.

20 Claims, 2 Drawing Sheets

OTHER PUBLICATIONS

P. C. Donohue, et al., J. Electrochem. Soc., vol. 121, No. 1, pp. 137–141, "The Synthesis and Photoluminescense of $M^{11}M_2^{111}(S,Se)_4$", Jan. 1974.

I. Tanaka, et al., The $22^{nd}$ Seminar Data Photoelectric Inter–Conversion the $125^{th}$ Commission EL Department, pp. 16–21, "Composition and Optical Properties of Blue–Emitting $BaAl_2S_4$: $Eu^{2+}$ Electroluminescent Thin Films", May 26, 2000 (with Concise Explanation and partial English translation).

T. E. Peters, J. Electrochem. Soc., vol. 119, No. 12, pp. 1720–1723, "Luminescent Properties of Thiogallate Phosphors", Dec. 1972.

T. E. Peters, et al., J. Electrochem. Soc., vol. 119, No. 2, pp. 230–236, "Luminescence and Structural Properties of Thiogallate Phosphors $Ce^{+3}$ and $Eu^{+2}$ –Activated Phosphors", Feb. 1972.

* cited by examiner

PHOSPHOR THIN FILM, PREPARATION METHOD, AND EL PANEL

BACKGROUND OF THE INVENTION

1. Technical Field

This invention relates to an oxysulfide thin film having a light emitting function, and more particularly, to a phosphor thin film used as a light-emitting layer in inorganic EL devices and an EL panel using the same.

2. Background Art

Figure 2:
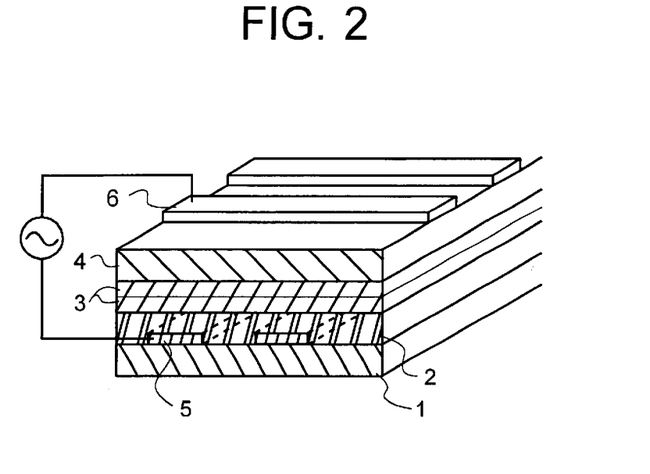
FIG. 2 is a partially cross-sectional, perspective view showing an exemplary construction of the inorganic EL device which can be manufactured by the method and apparatus of the invention.

In the recent years, active research works have been made on thin-film EL devices as small-size and large-size, light-weight flat displays. A monochromatic thin-film EL display using a phosphor thin film of manganese-doped zinc sulfide capable of emitting yellowish orange light has already become commercially practical as a dual insulated structure using thin-film insulating layers 2 and 4 as shown in FIG. 2. In FIG. 2, a predetermined pattern of lower electrodes 5 is formed on a substrate 1, and a first insulating layer 2 is formed on the lower electrodes 5. On the first insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primaries of red, green and blue have poor characteristics. Engineers continued research on SrS:Ce (using SrS as a matrix material and Ce as a luminescent center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primaries of red, green and blue suffer from problems of emission luminance, emission efficiency and color purity. Thus color EL panels have not reached the commercial stage. Referring to the blue color among others, a relatively high luminance is achieved using SrS:Ce. However, its luminance is still short as the blue color for full-color display and its chromaticity is shifted toward green. There is a desire to have a better blue light-emitting layer.

To solve the above problem, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Shinshu Univ. Technical Report, EID 98-113, pp. 19–24, and Jpn. J. Appl. Phys., Vol. 38 (1999), pp. L1291–1292. These thiogallate base phosphors are satisfactory in color purity, but suffer from a low luminance and especially, difficulty to form a thin film of uniform composition because of the multi-component composition. It is believed that thin films of quality are not obtainable because of poor crystallinity resulting from inconvenient composition control, formation of defects resulting from sulfur removal, and admittance of impurities; and these factors lead to a failure to increase the luminance. In particular, thioaluminate base phosphors are quite difficult to control their composition.

Contemplated for the formation of thioaluminate base thin films are a method of forming a target having the same composition as the end $BaAl_2S_4$:Eu thin film to be formed and sputtering the target to form a light emitting layer as described in JP-A 8-134440; and a method of forming two pellets of BaS:Eu and $Al_2S_3$, and evaporating them by a two-source pulse electron beam evaporation process, thereby depositing a $BaAl_2S_4$:Eu thin film as described in Jpn. J. Appl. Phys., Vol. 38 (1999), pp. L1291–1292.

JP-A 7-122364 discloses a method for forming a $SrIn_2S_4$:Eu light emitting layer by evaporating Sr metal, In metal and $EuCl_3$ by a molecular beam epitaxy (MBE) process in a vacuum chamber into which $H_2S$ gas is admitted, thereby depositing a $SrIn_2S_4$:Eu light emitting layer on a substrate. This method, however, is quite difficult to control the sources of metals for the matrix material ($SrIn_2S_4$) and the source of luminescent center substance (Eu) so as to accurately control the quantity of the luminescent center. For example, it is almost impossible with the current evaporation process that the molar ratio of Sr to In is controlled to 1:1 to induce sulfidation reaction with $H_2S$, the molar ratio of the matrix material to Eu is controlled to 99.5:0.1, and the variation of that 0.1 unit quantity of Ce is within 5%. Meanwhile, in the case of Al electrodes used as the electrodes of LSI, the variation in thickness of Al thin film is about 5% even when the evaporation source is relatively stable. It is then understood that controlling the concentration of Eu to a precision within 5% is very difficult.

As to red and green EL thin films aside from the blue EL thin film, for example, red light emitting phosphors ZnS:Sm and CaS:Eu and green light emitting phosphors ZnS:Tb and CaS:Ce, phosphor thin films capable of emitting light at a relatively high luminance can be produced by forming targets or pellets of the desired composition and vapor depositing them by a sputtering or EB evaporation process.

In order to develop practical full-color EL panels, phosphor materials capable of providing blue, green and red phosphors in a consistent manner and at a low cost and methods of preparing such phosphors are necessary. Since matrix materials of phosphor thin films and luminescent center materials individually have differing chemical or physical properties as described above, the preparation method differs depending on the identity of the phosphor thin film. A film forming method capable of deriving a high luminance from one material fails to achieve a high luminance for a phosphor thin film of another color. For the overall process of manufacturing a full-color EL panel, plural types of film forming apparatus are necessary. The manufacturing process becomes very complex, leading to an increased cost of panel manufacture.

Moreover, the electroluminescent spectra of the aforementioned blue, green and red EL phosphor thin films are all broad. When they are used in a full-color EL panel, RGB necessary as the panel must be cut out of the EL spectra of the EL phosphor thin films using filters. Use of filters complicates the manufacture process and, still worse, brings about a lowering of luminance. When RGB is taken out through filters, the luminance of blue, green and red EL phosphor thin films is lost by 10 to 50% so that the luminance is reduced below the practically acceptable level.

To solve the above-discussed problem, there remains a need for red, green and blue phosphor thin film materials capable of emitting light of a satisfactory color purity without a need for filters and at a high luminance, as well as phosphor matrix materials and luminescent center materials of similar chemical or physical properties which can be prepared to a high luminance capability by an identical film-forming method or film-forming apparatus.

SUMMARY OF THE INVENTION

An object of the invention is to provide a phosphor thin film eliminating a need for filters, having a satisfactory color purity and best suited as RGB in full-color EL displays, a method for preparing the same, and an EL panel.

Another object is to provide a phosphor thin film which enables to simplify the manufacture process of full-color EL panels, and offers the advantages of minimized variation of luminance, increased yields, and reduced manufacture cost, a method for preparing the same, and an EL panel.

These and other objects are attained by the present invention which is defined below as (1) to (8).

(1) A phosphor thin film formed of a matrix material comprising an oxysulfide consisting of at least one compound selected from rare earth thioaluminates, rare earth thiogallates and rare earth thioindates, in which oxygen is incorporated, said matrix material further containing an element serving as a luminescent center.

said matrix material further containing an element serving as a luminescent center.

(2) The phosphor thin film of (1) wherein the molar ratio of oxygen element to sulfur element in said oxysulfide, as expressed by O/(S+O), is in the range:

$$O/(S+O) = 0.01 \text{ to } 0.85.$$

(3) The phosphor thin film of (1) or (2) having the following compositional formula:

$$R_x A_y O_z S_w : M$$

wherein M is a metal element serving as the luminescent center, R is at least one element selected from rare earth elements, A is at least one element selected from Al, Ga and In, x is in the range of 1 to 5, y is in the range of 1 to 15, z is in the range of 3 to 30, and w is in the range of 3 to 30.

(4) The phosphor thin film of any one of (1) to (3) wherein said luminescent center is provided by a rare earth element.

(5) An EL panel having the phosphor thin film of any one of (1) to (4).

(6) A method for preparing the phosphor thin film of any one of (1) to (4), comprising
forming a sulfide thin film, and
annealing the thin film in an oxidizing atmosphere.

(7) A method for preparing the phosphor thin film of any one of (1) to (4) by an evaporation process, comprising
placing at least one evaporation source selected from aluminum sulfide, gallium sulfide and indium sulfide and an evaporation source of a rare earth sulfide having a luminescent center added thereto in a vacuum chamber, admitting oxygen gas into the vacuum chamber, and
evaporating at least one compound selected from aluminum sulfide, gallium sulfide and indium sulfide and the rare earth sulfide substance from the respective sources and depositing the evaporated substances on a substrate while binding the substances with oxygen gas, thereby forming a phosphor thin film.

(8) A method for preparing the phosphor thin film of (1) by an evaporation process, comprising
placing at least one evaporation source selected from aluminum sulfide, gallium sulfide and indium sulfide and an evaporation source of an rare earth metal or an rare earth sulfide having a luminescent center added thereto in a vacuum chamber, admitting hydrogen sulfide gas into the vacuum chamber,
evaporating at least one compound selected from aluminum sulfide, gallium sulfide and indium sulfide and the rare earth sulfide substance or rare earth metal substance from the respective sources and depositing the evaporated substances on a substrate while binding the substances with hydrogen sulfide gas, thereby forming a sulfide phosphor thin film, and
annealing the thin film in an oxidizing atmosphere.

Function

The present invention is arrived at by synthesizing compound materials, using a reactive deposition process as the common film forming process and chemically or physically stable oxides. The resulting phosphor thin films are able to emit light of different color covering a wide spectrum from red to blue.

The inventors formed thin films of rare earth thioaluminates, rare earth thiogallates and rare earth thioindates as thin film phosphors intended for EL application. EL devices were prepared using the thin films, but they failed to produce the desired light emission. The thin films had an emission luminance as low as 2 cd/m² at the highest. The luminance must be increased in order that the thin films be applied to EL device panels.

Based on these empirical results, the inventors continued research on phosphor thin films of the above series and reached the present invention. It has been found that an outstanding increase of luminance is accomplished by adding oxygen to rare earth thioaluminate, rare earth thiogallate and rare earth thioindate matrix materials to form oxysulfides.

DESCRIPTION OF THE PREFERRED EMBODIMENTS

Several embodiments of the invention are described in detail.

The phosphor thin film of the invention is formed of a matrix material comprising an oxysulfide consisting of at least one compound selected from rare earth thioaluminates, rare earth thiogallates and rare earth thioindates, in which oxygen is incorporated. A rare earth element is further added as a luminescent center.

The rare earth elements remain stable in sulfide and selenide forms. They are stable as compared with the compounds BaS and SrS which are formed in the course of production of thioaluminates, thiogallates and thioindates of alkaline earth elements such as Ba, Sr and Ca. They are also resistant to humidity and oxidation. Throughout the phosphor thin film forming process, contamination is minimized, and phosphor thin films of quality are obtained.

The rare earth oxysulfide used in the phosphor thin film of the invention preferably has the following compositional formula:

$$R_x A_y O_z S_w : M$$

wherein Re is an element serving as the luminescent center, R is at least one rare earth element, and A is at least one element selected from Al, Ga and In.

In the above formula, x, y, z and w denote molar ratios of elements R, A, O and S, and are preferably in the ranges of:
x=1 to 5,
y=1 to 15,
z=3 to 30, and
w=3 to 30.

The rare earth elements represented by R include Sc, Y, La, Ce, Pr, Nd, Pm, Sm, Eu, Gd, Tb, Dy, Ho, Er, Tm, Yb and Lu. Of these, Y, La, Ce, Eu, Gd, Er and Yb are preferred, with Eu and Yb being especially preferred.

The element A is aluminum, gallium or indium. Any desired combination of the element A with the element R is possible.

The atomic ratio of element A to element R, as expressed by A/R, is preferably in the range between 2 and 7.

The matrix material may use these compounds alone or in admixture of two or more and take an amorphouse state where a distinct crystalline structure is absent.

Preferably, oxygen is added to the rare earth oxysulfide matrix material in such amounts that the atomic ratio of oxygen to sulfur in the matrix material, as expressed by O/(S+O), is in the range from 0.01 to 0.85, and especially from 0.05 to 0.5. Differently stated, the value of z/(z+w) in the formula is preferably in the range of 0.01 to 0.85, more preferably 0.01 to 0.5, even more preferably 0.05 to 0.5, and especially 0.1 to 0.4.

Oxygen is effective for outstandingly enhancing the electroluminescent luminance of phosphor thin films. The light emitting device has a lifetime in that the luminance drops with the lapse of light emitting time. The addition of oxygen improves the lifetime performance and prevents the luminance from dropping. The addition of oxygen to rare earth thioaluminate, thiogallate or thioindate to form oxysulfide promotes crystallization of the matrix material during film deposition or during post treatment such as annealing after film deposition, and permits the rare earth element added to undertake effective transition within the compound crystal field, producing stable light emission at a high luminance. As compared with the matrix material of pure sulfide, the matrix material having oxygen added thereto is stable in air. This is probably because the stable oxide component protects the sulfide component in the film from the ambient air. Also, panels using this phosphor have an extended luminescent life, suggesting the development of highly reliable panels.

The composition of the phosphor thin film can be ascertained by x-ray fluorescence analysis (XRF), x-ray photoelectron spectroscopy (XPS) or the like.

The element Re contained as the luminescent center is one or more elements selected from among transition metal elements such as Mn and Cu, rare earth metal elements, lead (Pb) and bismuth (Bi). The rare earth element is selected from among at least Sc, Y, La, Ce, Pr, Nd, Gd, Tb, Ho, Er, Tm, Lu, Sm, Eu, Dy and Yb. Specifically, Eu and Ce are preferred for the blue phosphor, Eu, Ce, Tb and Ho are preferred for the green phosphor, and Pr, Sm, Yb and Nd are preferred for the red phosphor. Among these, Eu, Tb, Ce and Sm are preferred for combination with the matrix material. The most preferred elements are Eu and Sm. An appropriate amount of the luminescent center added is 0.1 to 10 at % based on the rare earth atoms.

The selenide used herein is not critical. The preferred selenides are rare earth selenaluminates $R_xAl_ySe_z$ wherein R is Sc, Y, La, Ce, Pr, Nd, Gd, Tb, Ho, Er, Tm or Lu, x, y and z are identical or different integers; rare earth selenagallates $R_xGa_ySe_z$ wherein R is Sc, Y, La, Ce, Pr, Nd, Gd, Tb, Ho, Er, Tm or Lu, x, y and z are identical or different integers; rare earth selenaindates $R_xIn_ySe_z$ wherein R is Sc, Y, La, Ce, Pr, Nd, Gd, Tb, Ho, Er, Tm or Lu, x, y and z are identical or different integers, in all of which oxygen is incorporated.

The rare earth element Re added as the luminescent center is selected from among at least Sc, Y, La, Ce, Pr, Nd, Gd, Tb, Ho, Er, Tm, Lu, Sm, Eu, Dy, and Yb, with Ce, Eu, Tb and Tm being preferred. These elements possess effective transition within the compound crystal field and provide light emission at a high luminance.

The phosphor thin film is preferably prepared, for example, by a reactive deposition process to be described below. The following description refers to a $EuAl_2O_zS_w$:Ce phosphor thin film as a typical example.

A europium aluminate pellet having cerium added is prepared. In a vacuum chamber to which $H_2S$ gas is admitted, the pellet is evaporated by irradiating electron beams. The $H_2S$ gas is used in order for sulfur to join reaction.

Alternatively, a multi-source reactive deposition process is employable.

Exemplary and preferred methods include a binary reactive deposition process using a europium oxide pellet having cerium added thereto, an alumina pellet, and $H_2S$ gas; a binary vacuum evaporation process using a europium sulfide pellet having cerium added thereto and an alumina pellet in the absence of a gas; a binary vacuum evaporation process using a europium oxide pellet having cerium added thereto and an aluminum sulfide pellet in the absence of a gas; and a binary reactive deposition process using a europium sulfide pellet having cerium added thereto, an aluminum sulfide pellet, and $O_2$ gas.

More preferably, a phosphor thin film is obtained by placing at least an aluminum sulfide evaporation source and an evaporation source of an europium sulfide having a luminescent center added thereto in a vacuum chamber, admitting oxygen ($O_2$) gas into the vacuum chamber, and evaporating aluminum sulfide and the europium sulfide substance from the respective sources and depositing the evaporated substances on a substrate while binding the substances with oxygen gas.

The method may further involve anneal treatment. In one preferred embodiment, once an europium thioaluminate thin film is formed by a binary reactive deposition process using an europium sulfide pellet, an aluminum sulfide pellet, and $H_2S$ gas or a binary reactive deposition process using an europium sulfide pellet and an aluminum sulfide pellet in the absence of a gas, the thin film is annealed in an oxidizing atmosphere such as oxygen or air. For example, once a thin film is formed by a binary reactive deposition process using an europium sulfide pellet having cerium added thereto, an aluminum sulfide pellet, and hydrogen sulfide ($H_2S$) gas, the thin film is annealed in air. The preferred annealing conditions include an oxidizing atmosphere having an oxygen concentration equal to or above the ambient atmosphere and a temperature in the range of 500 to 1,000° C., especially 600 to 800° C.

More preferably, a thin film is prepared by placing at least an aluminum sulfide evaporation source and an evaporation source of an europium sulfide having a luminescent center added thereto in a vacuum chamber, admitting hydrogen sulfide gas into the vacuum chamber, evaporating aluminum sulfide and the europium sulfide substance from the respective sources and depositing the evaporated substances on a substrate while binding the substances with hydrogen sulfide gas, thereby forming a sulfide phosphor thin film, and then annealing the thin film in an oxidizing atmosphere.

Cerium (Ce) added to the source substance may take the form of metal, fluoride, oxide or sulfide. Since the amount of cerium added varies depending on the source substance and the thin film to be deposited, the composition of the source substance is adjusted so as to achieve an appropriate dosage.

During the evaporation, the temperature of the substrate may be at room temperature to 600° C., preferably 100 to 300° C. If the substrate temperature is too high, the thin film of matrix material may have more asperities on its surface and contain pin holes therein, giving rise to the problem of current leakage on EL devices. Also the thin film can be colored brown. For this reason, the aforementioned temperature range is preferable.

The oxysulfide phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, $N_2$, Ar, sulfur vapor, $H_2S$, air or oxygen after its formation.

No particular limits are imposed on the thickness of the light emitting layer. However, too thick a layer requires an increased drive voltage whereas too thin a layer results in a low emission efficiency. Illustratively, the light emitting layer is preferably about 100 to 2,000 nm thick, especially about 150 to 700 nm although the thickness varies depending on the identity of the fluorescent material.

The pressure during evaporation is preferably $1.33 \times 10^{-4}$ to $1.33 \times 10^{-1}$ Pa ($1 \times 10^{-6}$ to $1 \times 10^{-3}$ Torr). Both the amounts of $O_2$ gas for adding oxygen and $H_2S$ gas for promoting sulfidation may be adjusted to provide a pressure of $6.65 \times 10^{-3}$ to $6.65 \times 10^{-2}$ Pa ($5 \times 10^{-5}$ to $5 \times 10^{-4}$ Torr). If the pressure exceeds the range, the operation of the electron gun becomes unstable, and composition control becomes very difficult. The rate of $H_2S$ or oxygen gas feed is preferably 5 to 200 standard cubic centimeters per minute (SCCM), especially 10 to 30 SCCM although it varies depending on the power of the vacuum system.

If desired, the substrate may be moved or rotated during evaporation. By moving or rotating the substrate, the deposited film becomes uniform in composition and minimized in the variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may arise a problem of seal upon admission into the vacuum chamber. If the rotational speed of the substrate is too low, compositional gradation may occur in the thickness direction within the chamber so that the characteristics of the light emitting layer may become poor. The means for rotating the substrate may be any well-known rotating mechanism including a power source such as a motor or hydraulic rotational mechanism and a power transmission/gear mechanism having a combination of gears, belts, pulleys and the like.

The means for heating the evaporation source and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

Figure 1:
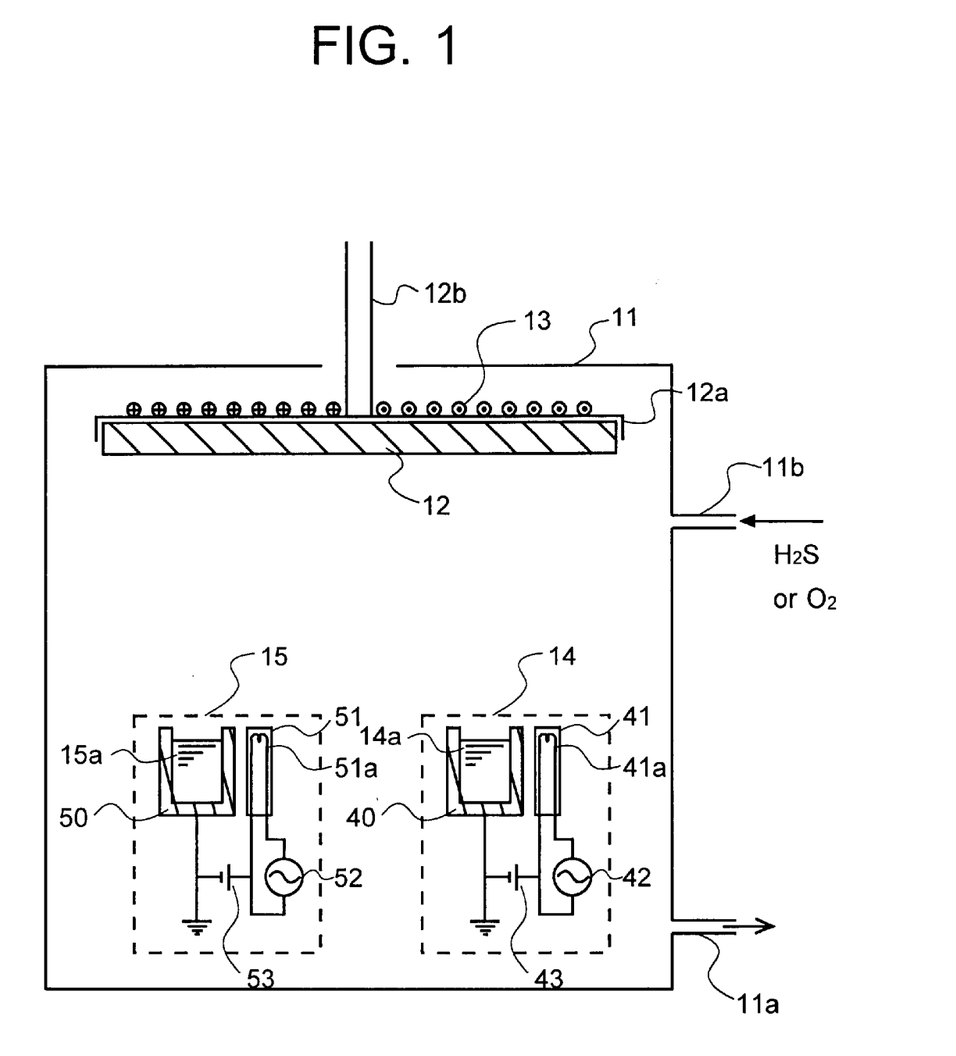
FIG. 1 is a schematic cross-sectional view showing an exemplary construction of the apparatus to which the method of the invention is applicable or the manufacturing apparatus of the invention.

FIG. 1 illustrates one exemplary construction of the apparatus for forming the light emitting layer according to the invention. Reference is made to an embodiment wherein oxygen-added europium thioaluminate:Ce is produced by using aluminum sulfide and europium sulfide as the evaporation sources and admitting oxygen during evaporation. In the illustrated embodiment, a substrate 12 on which the light emitting layer is to be deposited, and EB evaporation sources 14 and 15 are disposed within a vacuum chamber 11.

The electron beam (EB) evaporation sources 14 and 15 serving as means for evaporating aluminum sulfide and europium sulfide include crucibles 40 and 50 which contain europium sulfide 14a having a luminescent center added thereto and aluminum sulfide 15a, and electron guns 41 and 51 having electron emitting filaments 41a and 51a built therein, respectively. Built in the electron guns 41, 51 are mechanisms for controlling electron beams. To the electron guns 41, 51 are connected ac power supplies 42, 52 and bias power supplies 43, 53.

The electron guns 41, 51 produce electron beams at predetermined powers in a controlled manner, which are irradiated to the crucibles 40, 50 for evaporating the europium sulfide 14a having a luminescent center added thereto and the aluminum sulfide 15a in a predetermined ratio. Also employable is a process in which multi-source simultaneous evaporation is performed using a single electron gun, which is known as multi-source pulse evaporation process.

The vacuum chamber 11 has an exhaust port 11a through which the chamber is evacuated to establish a predetermined vacuum in the chamber. The vacuum chamber 11 also has an inlet port 11b through which a reactant gas such as oxygen or hydrogen sulfide gas is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire is closely secured to the substrate holder 12a so that the substrate may be heated and maintained at the desired temperature.

Using the illustrated apparatus, vapors of europium sulfide and aluminum sulfide are evaporated from the EB evaporation sources 14, 15 and deposited on the substrate 12 where they are bound with the oxygen admitted to thereby form an oxysulfide fluorescent layer. By rotating the substrate 12 during the evaporation process if desired, the light emitting layer being deposited can be made more uniform in composition and thickness distribution. Although two EB evaporation sources are used in the illustrated embodiment, the evaporation source is not limited to an EB evaporation source, and another evaporation source such as a resistive heating evaporation source may be used depending on a particular material and conditions used.

Also preferred is a process of forming a thioaluminate thin film by a multi-source reactive deposition process to be described below, and then annealing the thin film in an oxidizing atmosphere.

Specifically, rare earth metal and aluminum sulfide are evaporated and reacted on a substrate to form a thioaluminate thin film. Although the following description focuses at rare earth thioaluminate, thiogallate and thioindate may be similarly obtained using Group III metal sulfides such as gallium sulfide and indium sulfide. For promoting sulfidation, hydrogen sulfide ($H_2S$) gas is preferably used as the sulfur source.

Aluminum sulfide may deviate about 10% from the stoichiometry although it is preferred that aluminum sulfide be as close to the stoichiometry as possible in order that the amount of the luminescent center that is added to the sulfide to form an evaporation source have a higher precision.

The luminescent center is added to aluminum sulfide. Even in an amount of less than several mol %, the luminescent center can be uniformly added to aluminum sulfide. The aluminum sulfide in pellet, powder, compact or mass form is evaporated. The luminescent center substance is evaporated and moved onto the substrate along with the aluminum sulfide so that a trace amount of the luminescent center may be added to the thioaluminate base light emitting layer in a controlled manner. That is, the aluminum sulfide plays the role of a carrier for the impurity substance (luminescent center), permitting less than 1 mol % of the luminescent center to be uniformly added to the thioaluminate at a high precision.

Any of the aforementioned rare earth elements or the like may be added as the luminescent center. The rare earth added to the source substance may take the form of metal, fluoride or sulfide. Since the amount of rare earth added varies depending on the source substance and the thin film to be deposited, the composition of the source substance is adjusted so as to achieve an appropriate dosage.

The inventive method not only enables to control the composition of thioalumiate, but also improves the crystallinity of thioaluminate. Since the thioaluminate thin film can be readily controlled so as to provide a ratio Eu:Al:S of 1:2:1 for $EuAl_2S_4$, for example, its crystallinity becomes high. In the course of diffusion of S, Al, Eu, $Al_2S_3$, EuS and clusters thereof on the substrate surface, the respective elements settle at their stable crystal sites. This results in a high crystallinity thin film. In particular, since the EL device relies on a light emission phenomenon under a high electric field, the crystallinity of a matrix material must be increased in order to provide a phosphor thin film having a high luminance. The present invention provides a phosphor thin film which readily crystallizes. A gas such as sulfur may be admitted if necessary.

The sulfide phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, $N_2$, Ar, sulfur vapor, $H_2S$ or the like after its formation. In particular, an oxysulfide phosphor thin film is obtainable by forming a thioaluminate thin film by the aforementioned process, and then annealing the thin film in an oxidizing atmosphere.

There have been described the fluorescent thin film material and the method of manufacture by evaporation according to the invention, by which a phosphor thin film capable of light emission at a higher luminance can be easily formed.

Using the phosphor thin film of the invention as a light emitting layer 3, an inorganic EL device is manufactured, for example, to the structure shown in FIG. 2.

FIG. 2 is a partially cross-sectional, perspective view showing an exemplary construction of the inorganic EL device using the light emitting layer of the invention. In FIG. 2, a predetermined pattern of lower electrodes 5 is formed on a substrate 1, and a first thick insulating layer (or thick-film dielectric layer) 2 is formed on the lower electrode-bearing substrate 1. On the first insulating layer 2, a light-emitting layer 3 and a second insulating layer (or thin-film dielectric layer) 4 are successively formed. On the second insulating layer 4, a predetermined pattern of upper electrodes 6 is formed so as to construct a matrix circuit with the lower electrodes 5.

Between the substrate 1, electrodes 5, 6, thick-film insulating layer 2 and thin-film insulating layer 4, there may be disposed intermediate layers such as a layer for enhancing bond, a layer for mitigating stress, and a layer for preventing reaction. The thick film may be improved in smoothness as by polishing its surface or using a smoothing layer.

Any desired material may used as the substrate as long as the substrate has a heat resistant temperature or melting point of at least 600° C., preferably at least 700° C., especially at least 800° C. so that the substrate may withstand the thick-film forming temperature, the forming temperature of the EL fluorescent layer and the annealing temperature of the EL device, the substrate allows deposition thereon of functional thin films such as a light emitting layer by which the EL device can be constructed, and the substrate maintains the predetermined strength. Illustrative examples include ceramic substrates of glass, alumina ($Al_2O_3$), forsterite ($2MgO.SiO_2$), steatite ($MgO.SiO_2$), mullite ($3Al_2O_3 \cdot 2SiO_2$), beryllia (BeO), aluminum nitride (AlN), silicon nitride (SiN), and silicon carbide (SiC+BeO) as well as heat resistant glass substrates of crystallized glass or the like. Of these, alumina substrates and crystallized glass substrates are especially preferable. Where heat transfer is necessary, berillia, aluminum nitride, silicon carbide and the like are preferred.

Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred.

Any well-known thick-film dielectric material may be used as the thick-film dielectric material (first insulating layer). Materials having a relatively high permittivity are preferred.

For example, lead titanate, lead niobate and barium titanate based materials can be used.

The dielectric thick film has a resistivity of at least $10^8$ Ω·cm, especially about $10^{10}$ to $10^{18}$ Ω·cm. A material having a relatively high permittivity as well is preferred. The permittivity $\epsilon$ is preferably about 100 to 10,000. The preferred thickness is 5 to 50 µm, especially 10 to 30 µm.

The insulating layer thick film is formed by any desired method. Methods capable of relatively easily forming films of 10 to 50 µm thick are useful, and the sol-gel method and printing/firing method are especially preferred.

Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (second insulating layer) is made include silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials, and multilayer or mixed thin films of any. In forming the insulating layer from these materials, any of conventional methods such as evaporation, sputtering, CVD, sol-gel and printing/firing methods may be used. The insulating layer preferably has a thickness of about 50 to 1,000 nm, especially about 100 to 500 nm.

The electrode (lower electrode) is formed at least on the substrate side or within the first dielectric. As the electrode layer which is exposed to high temperature during formation of a thick film and during heat treatment along with the light emitting layer, there may be employed a customary metal electrode containing as a main component one or more elements selected from palladium, rhodium, iridium, rhenium, ruthenium, platinum, tantalum, nickel, chromium and titanium.

Another electrode layer serving as the upper electrode is preferably a transparent electrode which is transmissive to light in the predetermined emission wavelength region because the emitted light often exits from the opposite side to the substrate. When the substrate is transparent, a transparent electrode may also be used as the lower electrode because this permits the emitted light to exit from the substrate side. Use of transparent electrodes of ZnO, ITO or the like is especially preferred. ITO generally contains $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode layer may be either polycrystalline silicon (p-Si) or amorphous silicon (a-Si), or even single crystal silicon if desired.

In addition to silicon as the main component, the electrode is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode layer should preferably have a resistivity of up to 1 $\Omega$·cm, especially about 0.003 to 0.1 $\Omega$·cm in order to apply an effective electric field across the light emitting layer. The preferred thickness of the electrode layer is about 50 to 2,000 nm, especially about 100 to 1,000 nm, although it varies with the material of the electrode layer.

Although the embodiment wherein the light emitting layer of the invention is applied to inorganic EL devices has been described, it may be applied to another type of device as long as the phosphor thin film of the invention can be used therein, and especially to red, blue and green light emitting devices, which can be applied to full-color display panels.

EXAMPLE

Examples are given below for illustrating the invention in more detail.

Example 1

FIG. 1 illustrates an exemplary evaporation chamber which can be used in the manufacturing method of the invention. One electron gun and one resistive heating source (or cell) were used instead of two electron guns.

An EB source 15 containing EuS powder having 5 mol % of $Ce_2S_3$ added and a cell source 14 containing $Al_2S_3$ powder were placed in a vacuum chamber 11. The substances were simultaneously evaporated from the respective sources, and deposited on a rotating substrate heated at 400° C., forming a $EuAl_2S_4$:Ce layer. The rates of evaporation from the respective sources were adjusted so as to give a deposition rate of 1 nm/sec for $EuAl_2S_4$ and a molar ratio Eu:$Al_2S_3$ of 1:1. During evaporation, $H_2S$ gas was admitted at 20 SCCM. An insulating thin film was formed thereon, and the structure was annealed at 750° C. for 10 minutes in air, yielding an oxysulfide phosphor thin film, $EuAl_2O_zS_w$:Ce.

The resulting $EuAl_2O_zS_w$:Ce thin film was analyzed for composition by x-ray fluorescence to find an atomic ratio of Eu:Al:O:S:Eu=13.14:29.29:17.44:30.14:0.21.

An EL device was fabricated using this light emitting layer.

Figure 3:
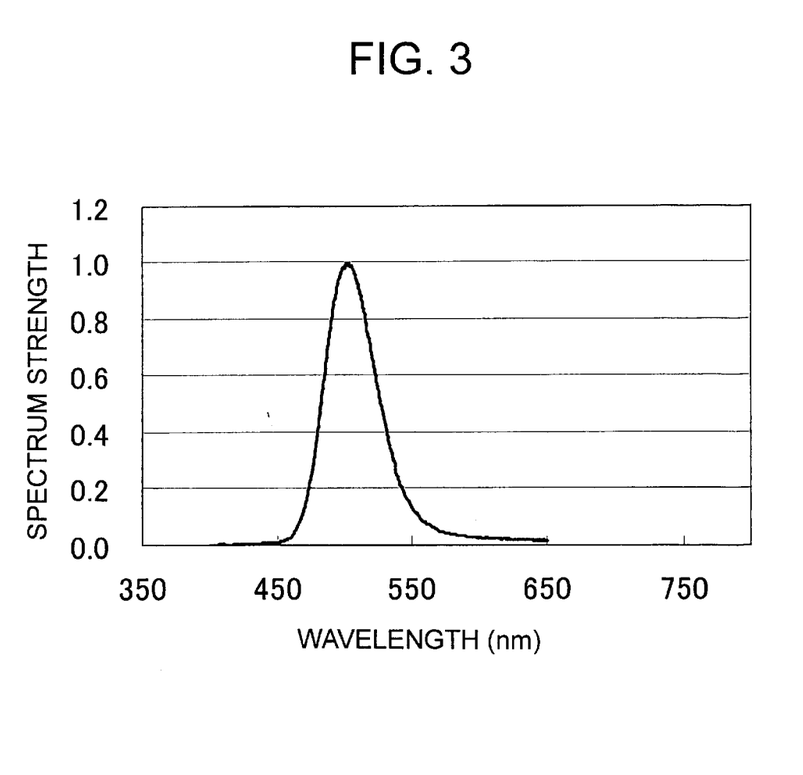
FIG. 3 is a diagram showing the emission spectrum of the EL device of Example 1.

When an electric field having a frequency of 1 kHz and a pulse width of 50 $\mu$S was applied across the electrodes sandwiching the light emitting layer and insulating layers, the EL device emitted green light having a luminance of 100 $cd/m^2$ in a fully reproducible manner. The spectrum of light emission is shown in FIG. 3.

Example 2

In Example 1, ytterbium (Yb) was used instead of Eu as the rare earth element, neodymium (Nd) was used instead of Ce, and $Ga_2S_3$ was used instead of $Al_2S_3$. Equivalent results were obtained, with emission of red light.

Example 3

In Example 1, yttrium (Y) was used instead of Eu as the rare earth element, europium (Eu) was used instead of Ce, and $In_2S_3$ was used instead of $Al_2S_3$. Equivalent results were obtained, with emission of red light as well.

Example 4

In Example 1, ytterbium (Yb) was used instead of Eu as the rare earth element, and europium (Eu) was used instead of Ce. Equivalent results were obtained, with emission of blue light.

The phosphor thin film of the invention offers a phosphor thin film material capable of emitting red, green and blue light having a high color purity without a need for filters and a high luminance while it can be produced to a high luminance by an identical film-forming process and film-forming apparatus.

Using phosphor matrix materials and luminescent center materials having similar chemical or physical properties, it becomes possible to simplify the manufacture process of full-color EL panels, minimize the variation of luminance, increase the yield, and reduce the manufacture cost.

The manufacturing method of the invention can carry out composition control in a reproducible manner, overcomes the problem of short sulfur in the sulfide as the matrix material of the phosphor thin film and the problem of impurity introduction, and is successful in producing a light emitting layer with a high luminance.

The EL devices using the thin films according to the invention have improved emission performance and are of great commercial worth because light emitting layers can be produced in a reproducible manner when multi-color and full-color EL devices are formed.

Benefits of the Invention

The invention provides a phosphor thin film eliminating a need for filters, having a satisfactory color purity and best suited as RGB in full-color EL displays, a method for preparing the same, and an EL panel.

It also provides a phosphor thin film which enables to simplify the manufacture process of full-color EL panels, and offers the advantages of minimized variation of luminance, increased yields, and reduced manufacture cost, a method for preparing the same, and an EL panel.

What is claimed is:

1. A phosphor thin film comprising a matrix material comprising:
   an oxysulfide consisting of:
      oxygen, and
      at least one compound selected from the group consisting of rare earth thioaluminates, rare earth thiogallates, rare earth thioindates, and combinations thereof; and
   an element serving as a luminescent center;
      wherein the phosphor thin film has the following compositional formula:

$R_x A_y O_z S_w$ :M wherein M is a metal element serving as the luminescent center, R is at least one element selected from the group consisting of rare earth elements, A is at least one element selected from the group consisting of Al, Ga, and In, x ranges from 1 to 5, y ranges from 1 to 15, z ranges from 3 to 30, and w ranges from 3 to 30.

2. The phosphor thin film of claim 1 wherein the molar ratio of oxygen element to sulfur element in said oxysulfide, as expressed by O/(S+O), is in the range:

$O/(S+O)=0.01$ to $0.85$.

3. The phosphor thin film of claim 1 wherein said luminescent center comprises a rare earth element.
4. An EL panel having the phosphor thin film of claim 1.
5. A method for preparing the phosphor thin film of claim 1, comprising
   forming a sulfide thin film, and
   annealing the thin film in an oxidizing atmosphere.
6. A method for preparing the phosphor thin film of claim 1 by an evaporation process, comprising
   placing at least one evaporation source selected from aluminum sulfide, gallium sulfide and indium sulfide and an evaporation source of a rare earth sulfide having a luminescent center added thereto in a vacuum chamber, admitting oxygen gas into the vacuum chamber, and
   evaporating at least one compound selected from aluminum sulfide, gallium sulfide and indium sulfide and the rare earth sulfide substance from the respective sources and depositing the evaporated substances on a substrate while binding the substances with oxygen gas, thereby forming a phosphor thin film.
7. A method for preparing the phosphor thin film of claim 1 by an evaporation process, comprising
   placing at least one evaporation source selected from aluminum sulfide, gallium sulfide and indium sulfide and an evaporation source of an rare earth metal or an rare earth sulfide having a luminescent center added thereto in a vacuum chamber, admitting hydrogen sulfide gas into the vacuum chamber,
   evaporating at least one compound selected from aluminum sulfide, gallium sulfide and indium sulfide and the rare earth sulfide substance or rare earth metal substance from the respective sources and depositing the evaporated substances on a substrate while binding the substances with hydrogen sulfide gas, thereby forming a sulfide phosphor thin film, and
   annealing the thin film in an oxidizing atmosphere.
8. The phosphor thin film of claim 1, wherein the rare earth thioaluminates, rare earth thiogallates and rare earth thioindates comprise a rare earth element selected from the group consisting of Sc, Y, La, Ce, Pr, Nd, Pm, Sm, Eu, Gd, Tb, Dy, Ho, Er, Tm, Yb, and Lu.
9. The phosphor thin film of claim 1, wherein the rare earth thioaluminates, rare earth thiogallates and rare earth thioindates comprise a rare earth element selected from the group consisting of Y, La, Ce, Eu, Gd, Er, and Yb.
10. The phosphor thin film of claim 1, wherein the rare earth thioaluminates, rare earth thiogallates and rare earth thioindates comprise a rare earth element selected from the group consisting of Eu and Yb.
11. The phosphor thin film of claim 1 wherein the oxysulfide comprises a molar ratio of oxygen element to sulfur element expressed by O/(S+O) of 0.01 to 0.5.
12. The phosphor thin film of claim 1 wherein the oxysulfide comprises a molar ratio of oxygen element to sulfur element expressed by O(S+O) of 0.05 to 0.5.
13. The phosphor thin film of claim 1 wherein the oxysulfide comprises a molar ratio of oxygen element to sulfur element expressed by O/(S+O) of 0.1 to 0.4.
14. The phosphor thin film of claim 1 wherein said luminescent center comprises one or more elements selected from the group consisting of a transition metal element, a rare earth metal element, lead and bismuth.
15. The phosphor thin film of claim 1 wherein said luminescent center is a transition metal element selected from the group consisting of Mn and Cu.
16. The phosphor thin film of claim 1 wherein said luminescent center is a rare earth element selected from the group consisting of Sc, Y, La, Ce, Pr, Nd, Gd, Tb, Ho, Er, Tm, Lu, Sm, Eu, Dy, and Yb.
17. The phosphor thin film of claim 1 wherein the luminescent center is a rare earth element selected from the group consisting of Eu and Ce.
18. The phosphor thin film of claim 1 wherein said luminescent center is a rare earth element selected from the group consisting of Eu, Ce, Tb, and Ho.
19. The phosphor thin film of claim 1 wherein said luminescent center is a rare earth element selected from the group consisting of Pr, Sm, Yb, and Nd.
20. A phosphor thin film comprising a matrix material comprising:
    an oxysulfide consisting of:
       oxygen, and
       at least one compound selected from the group consisting of rare earth thioaluminates, rare earth thiogallates, rare earth thioindates, and combinations thereof; and
    an element serving as a luminescent center;
    wherein the phosphor thin film has the following compositional formula:

$R_x A_y O_z S_w$ :M wherein M is a metal element serving as the luminescent center, R is at least one element selected from the group consisting of rare earth elements, A is at least one element selected from the group consisting of Al, Ga, and In, x ranges from 1 to 5, y ranges from 1 to 15, w ranges from 3 to 30, and z is such that oxygent to sulfur ration (z/(w+z) ranges from 1.01 to 0.85.

* * * * *

UNITED STATES PATENT AND TRADEMARK OFFICE
CERTIFICATE OF CORRECTION

PATENT NO. : 6,656,610 B2
DATED : December 2, 2003
INVENTOR(S) : Yoshihiko Yano et al.

It is certified that error appears in the above-identified patent and that said Letters Patent is hereby corrected as shown below:

<u>Column 14,</u>
Line 64, "1.01" should read -- 0.01 --.

Signed and Sealed this

Twenty-second Day of June, 2004

JON W. DUDAS
*Acting Director of the United States Patent and Trademark Office*